United States Patent
Anand et al.

(10) Patent No.: US 9,066,288 B2
(45) Date of Patent: Jun. 23, 2015

(54) APPARATUS AND METHOD FOR ENABLING COMMUNICATION ON A SUPPLEMENTAL CHANNEL IN A GSM WIRELESS COMMUNICATION NETWORK

(75) Inventors: Raghavendra S. Anand, Hyderabad (IN); Subbamma A. Manjunatha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 13/615,106

(22) Filed: Sep. 13, 2012

(65) Prior Publication Data

US 2014/0071976 A1    Mar. 13, 2014

(51) Int. Cl.
| | |
|---|---|
| H04W 4/00 | (2009.01) |
| H04J 3/06 | (2006.01) |
| H04W 56/00 | (2009.01) |
| H04W 72/04 | (2009.01) |
| H04W 72/00 | (2009.01) |

(52) U.S. Cl.
CPC .............. *H04W 56/00* (2013.01); *H04W 72/04* (2013.01); *H04W 72/005* (2013.01)

(58) Field of Classification Search
None
See application file for complete search history.

(56) References Cited

U.S. PATENT DOCUMENTS

| 7,054,285 B2 | 5/2006 | Molno et al. |
|---|---|---|
| 7,974,263 B2 | 7/2011 | Lee et al. |
| 2005/0020299 A1 | 1/2005 | Malone et al. |
| 2006/0171345 A1 | 8/2006 | Hildebrand et al. |
| 2007/0091845 A1* | 4/2007 | Brideglall ............. 370/331 |
| 2009/0135755 A1* | 5/2009 | Qi et al. ............... 370/311 |
| 2010/0046359 A1* | 2/2010 | Xu et al. ............... 370/210 |
| 2010/0330943 A1* | 12/2010 | Hoepfner ............ 455/226.2 |
| 2012/0040703 A1 | 2/2012 | Kawase et al. |
| 2013/0079025 A1* | 3/2013 | Chen et al. ............ 455/450 |

FOREIGN PATENT DOCUMENTS

| EP | 0954189 A2 | 11/1999 |
|---|---|---|
| WO | 9811688 A1 | 3/1998 |
| WO | 0070793 A1 | 11/2000 |

OTHER PUBLICATIONS

International Search Report and Written Opinion—PCT/US2013/059766—ISA/EPO—Jan. 9, 2014.

* cited by examiner

*Primary Examiner* — Jutai Kao

(74) *Attorney, Agent, or Firm* — Donald C. Kordich

(57) ABSTRACT

An apparatus and method are disclosed for utilizing a supplemental downlink channel in a GSM network. The supplemental downlink channel may be referred to as a GSM Prime channel. The GSM Prime channel utilizes idle frames that are otherwise unused in the GSM network to carry control and data information. A receiving unit capable of receiving the GSM Prime channel is also disclosed. Some embodiments may be mobile devices configured for conventional GSM communication in addition to the receiving of the GSM Prime. Other embodiments may be dedicated GSM Prime receiving units. Other aspects, embodiments, and features are also claimed and described.

24 Claims, 8 Drawing Sheets

APPARATUS AND METHOD FOR ENABLING COMMUNICATION ON A SUPPLEMENTAL CHANNEL IN A GSM WIRELESS COMMUNICATION NETWORK

TECHNICAL FIELD

Aspects of the present disclosure relate generally to wireless communication systems, and more particularly, to methods and devices for enabling communication on a supplemental channel in a GSM wireless communication network.

BACKGROUND

Wireless communications systems are widely deployed to provide various types of communication content such as voice, video, packet data, messaging, broadcast, and so on. These systems may be accessed by various types of devices adapted to facilitate wireless communications, where multiple devices share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

In any wireless communication system, the availability of scarce radio spectrum resources remains a paramount concern, and substantial resources continue to be devoted to this issue. For example, in a conventional GSM wireless network, spectrum allocation was implemented decades ago, and accordingly, over time, certain inefficiencies have become evident. For example, some level of spectrum efficiency was sacrificed to provide for less expensive mobile station design utilizing the technologies available at the time. However, with the rapid and continued advancement in solid state technology since that time, access terminal capabilities are such that improved use of spectrum may be achievable.

As the demand for mobile broadband access continues to increase, research and development continue to advance the wireless technologies not only to meet the growing demand for mobile broadband access, but to advance and enhance the user experience with mobile communications.

BRIEF SUMMARY OF SOME EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method of wireless communication in a GSM network, the method operable at a receiving unit. Here, the method includes receiving a transmission comprising a plurality of idle frames, where the plurality of idle frames comprise a control frame and at least one data frame, and decoding the at least one data frame in accordance with control information in the control frame.

Another aspect of the disclosure provides a receiving unit configured for wireless communication in a GSM network. Here, the receiving unit includes means for receiving a transmission comprising a plurality of idle frames, wherein the plurality of idle frames comprise a control frame and at least one data frame, and means for decoding the at least one data frame in accordance with control information in the control frame.

Another aspect of the disclosure provides a computer program product, including a computer-readable storage medium configured for operation in a GSM network. Here, the computer-readable storage medium includes instructions for causing a computer to receive a transmission comprising a plurality of idle frames, wherein the plurality of idle frames comprise a control frame and at least one data frame, and instructions for causing a computer to decode the at least one data frame in accordance with control information in the control frame.

Another aspect of the disclosure provides a receiving unit configured for wireless communication in a GSM network, including a processing circuit, a communications interface coupled to the processing circuit, and a memory coupled to the processing circuit, wherein the processing circuit is configured to receive a transmission comprising a plurality of idle frames, wherein the plurality of idle frames comprise a control frame and at least one data frame, and to decode the at least one data frame in accordance with control information in the control frame.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
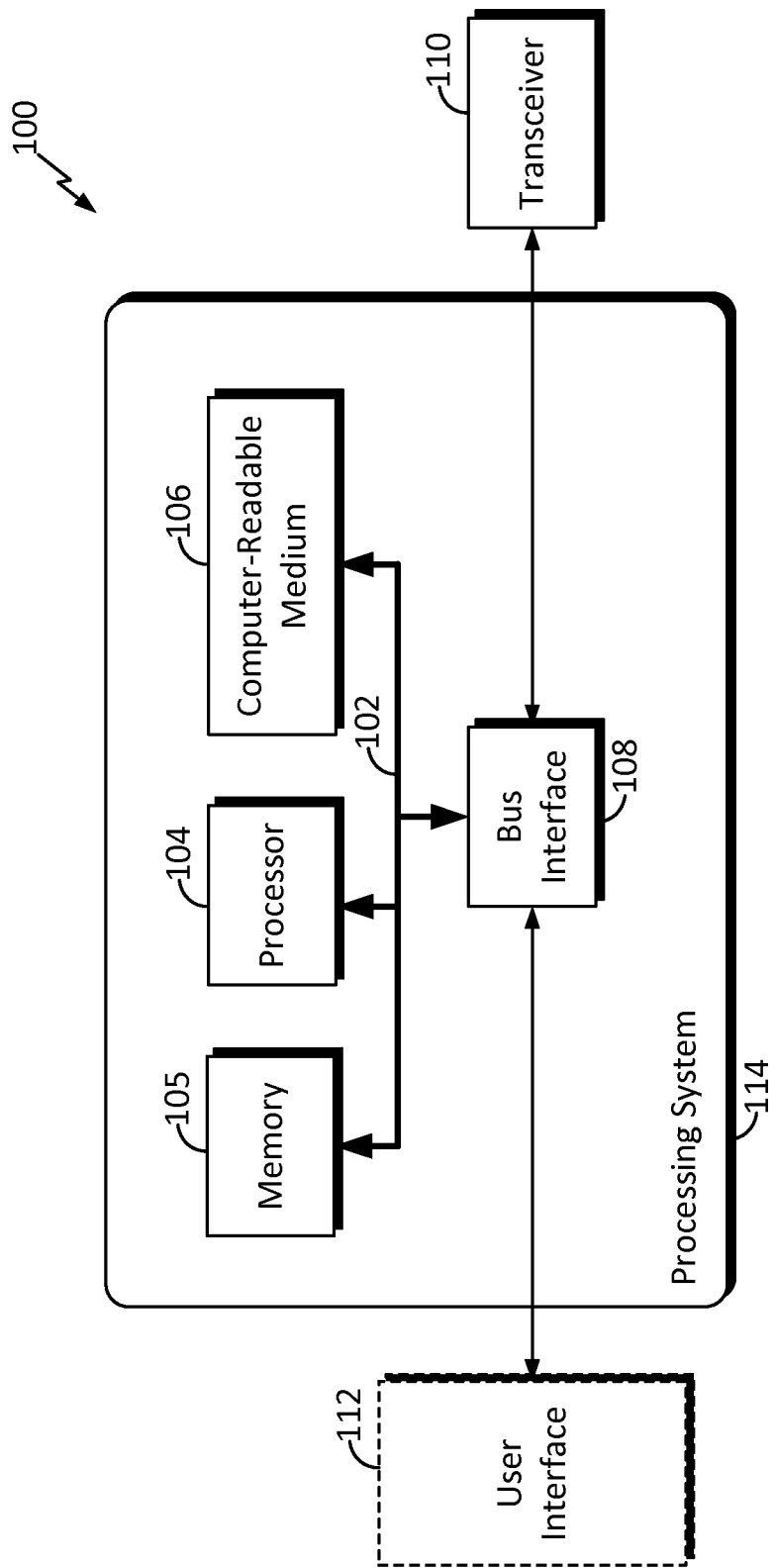
FIG. 1 is a block diagram illustrating an example of a hardware implementation for an apparatus employing a processing system.

In the following description, specific details are given to provide a thorough understanding of the described implementations. However, it will be understood by one of ordinary skill in the art that at least some of the aspects described herein may be practiced without these specific details. For example, circuits may be shown in block diagrams in order not to obscure the implementations in unnecessary detail. In other instances, well-known circuits, structures and techniques may be shown in detail in order not to obscure the implementations.

In the following description, certain terminology is used to describe certain features of one or more implementations. The terms "access terminal" and "programming" as used herein are meant to be interpreted broadly. For example, an "access terminal" refers generally to one or more devices that communicate with one or more other devices through wireless signals. Such access terminals may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. Access terminals may include mobile terminals and/or at least substantially fixed terminals. Examples of access terminals include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, smartphones, entertainment devices, network access points (e.g., home/personal/business wireless routers) and/or other communication/computing devices which communicate, at least partially, through a wireless or cellular network.

Furthermore, the term "programming" shall be construed broadly to include without limitation instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Aspects of the present disclosure may be incorporated into various components of a communication system. For example, some examples can be implemented in network-based components (e.g., base station, network control, or communication devices), access terminal components (e.g., mobile devices or receiving units), or a combination thereof. For example, one or more aspects of the present disclosure identify unused spectrum in the GSM space and provide apparatus and methods for utilizing this unused spectrum to enable effective low-rate broadcast or multicast services.

FIG. 1 is a conceptual diagram illustrating an example of a hardware implementation for an apparatus 100 employing a processing system 114. In accordance with various aspects of the disclosure, an element, or any portion of an element, or any combination of elements may be implemented with a processing system 114 that includes one or more processors 104. Examples of processors 104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors (represented generally by the processor 104), a memory 105, and computer-readable media (represented generally by the computer-readable medium 106). The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

One or more processors 104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 106. The computer-readable medium 106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 106 may reside in the processing system 114, external to the processing system 114, or distributed across multiple entities including the processing system 114. The computer-readable medium 106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 2:
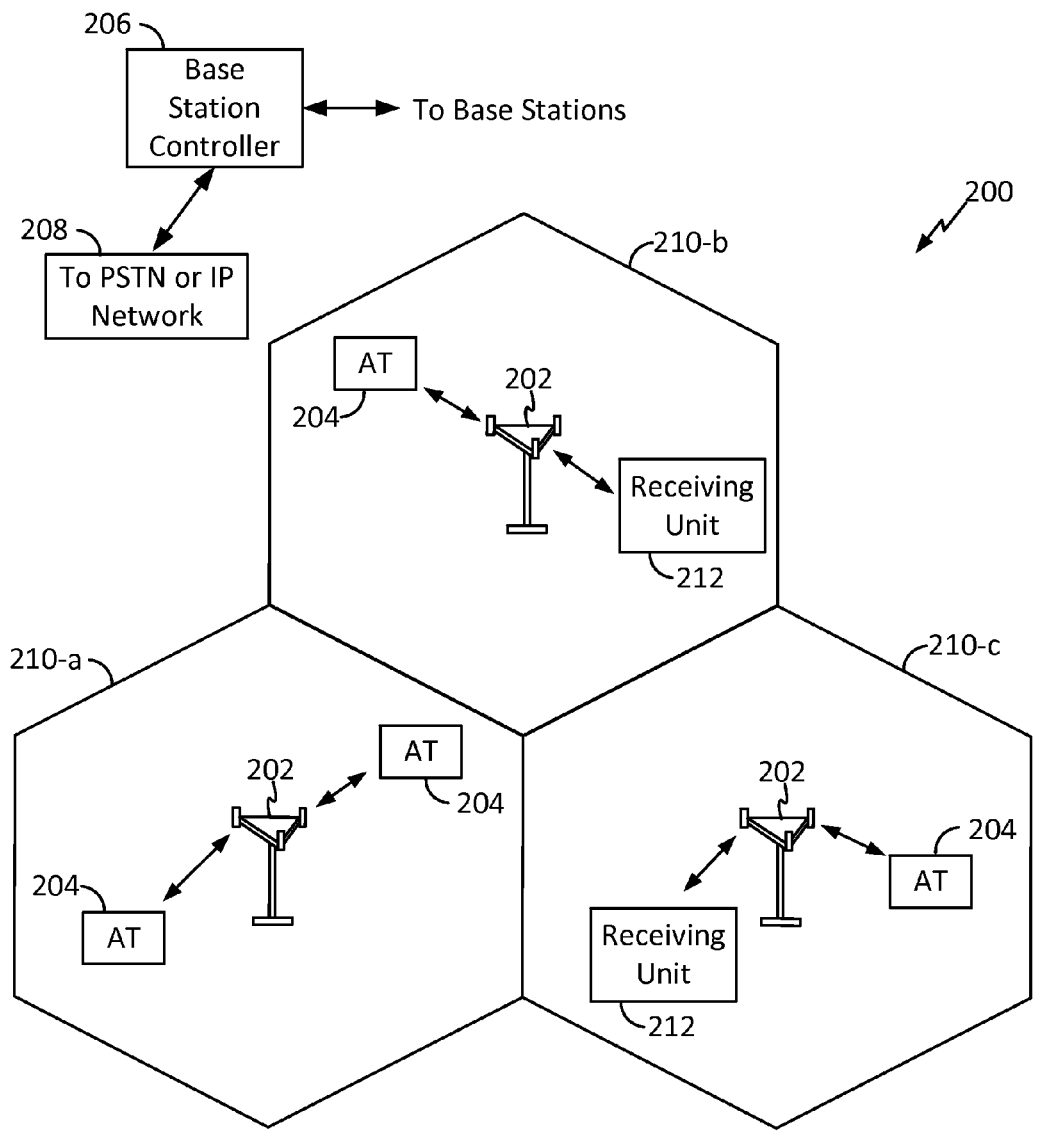
FIG. 2 is a conceptual diagram illustrating an example of an access network in a GSM system.

The various concepts presented throughout this disclosure may be implemented across a broad variety of telecommunication systems, network architectures, and communication standards. Although the discussions herein may present examples of 3rd Generation Partnership Project (3GPP) Global System for Mobile (GSM) protocols and systems, those of ordinary skill in the art will recognize that one or more aspects of the present disclosure may be employed and included in one or more other wireless communication protocols and systems. FIG. 2 is a schematic diagram illustrating one example of an access network in a GSM architecture in which one or more aspects of the present disclosure may find application. The wireless communication system 200 generally includes one or more base stations 202, one or more access terminals 204, one or more base station controllers (BSC) 206, and a core network 208 providing access to a public switched telephone network (PSTN) (e.g., via a mobile switching center/visitor location register (MSC/VLR)) and/or to an IP network (e.g., via a packet data switching node (PDSN)). As described in further detail below, in some aspects of the present disclosure the wireless communication system may further include one or more receiving units 212 with additional or different functionality from the GSM access terminals 204, for example, for receiving downlink transmissions described within the present disclosure on a supplemental channel which may be referred to as a GSM Prime channel.

In various examples, the processing system 114 illustrated in FIG. 1 may be included in any one or more of the base stations 202, the access terminals 204, the base station controller 206, and/or the receiving units 212. The system 200 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 202 may wirelessly communicate with the access terminals 204 via one or more base station antennas. The base stations 202 may each include a device that facilitates wireless connectivity (for one or more access terminals 204) to the wireless communications system 200. For example, the base stations 202 may include access points, base transceiver stations (BTS), radio base stations, radio transceivers, transceiver functions, basic service sets (BSS), extended service sets (ESS), Node Bs, femto cells, pico cells, and/or some other suitable device.

The base stations 202 are configured to communicate with the access terminals 204 under the control of the base station controller 206 via multiple carriers. Each of the base stations 202 can provide communication coverage for a respective geographic area. The coverage area 210 for each base station 202 here is identified as cells 210-a, 210-b, or 210-c. The coverage area 210 for a base station 202 may be divided into sectors (not shown, but making up only a portion of the coverage area). In a coverage area 210 that is divided into sectors, the multiple sectors within a coverage area 210 can be formed by groups of antennas with each antenna responsible for communication with one or more access terminals 204 in a portion of the cell.

The access terminals 204 and/or the receiving units 212 may be dispersed throughout the coverage areas 210, and may wirelessly communicate with one or more sectors associated with each respective base station 202. The access terminals 204 and the receiving units 212 may be adapted to employ a protocol stack architecture for communicating data between the access terminal 204 and one or more network nodes of the wireless communication system 200 (e.g., the base station 202). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base.

According to various aspects of the present disclosure, receiving units are provided, which are adapted to receive transmissions from a base station including a supplemental channel (e.g., the GSM Prime channel) carried on a plurality of idle frames. Here, control information corresponding to the supplemental channel may be provided to the receiving unit on a broadcast channel (BCH), and user data corresponding to the supplemental channel may be provided to the receiving unit on a traffic channel (TCH) included on the same ARFCN on which the control information is provided. In the present disclosure, as a generic term, "receiving unit" will be broadly utilized to refer to an access terminal 204 configured to communicate with the base stations 202 in accordance with GSM specifications, and additionally configured to utilize a GSM Prime communication as channel described herein; as well as the receiving units 212 described above, which are configured to receive the GSM Prime communication channel described herein but not necessarily being capable of transmissions or other capabilities of a fully GSM-capable access terminal.

Figure 3:
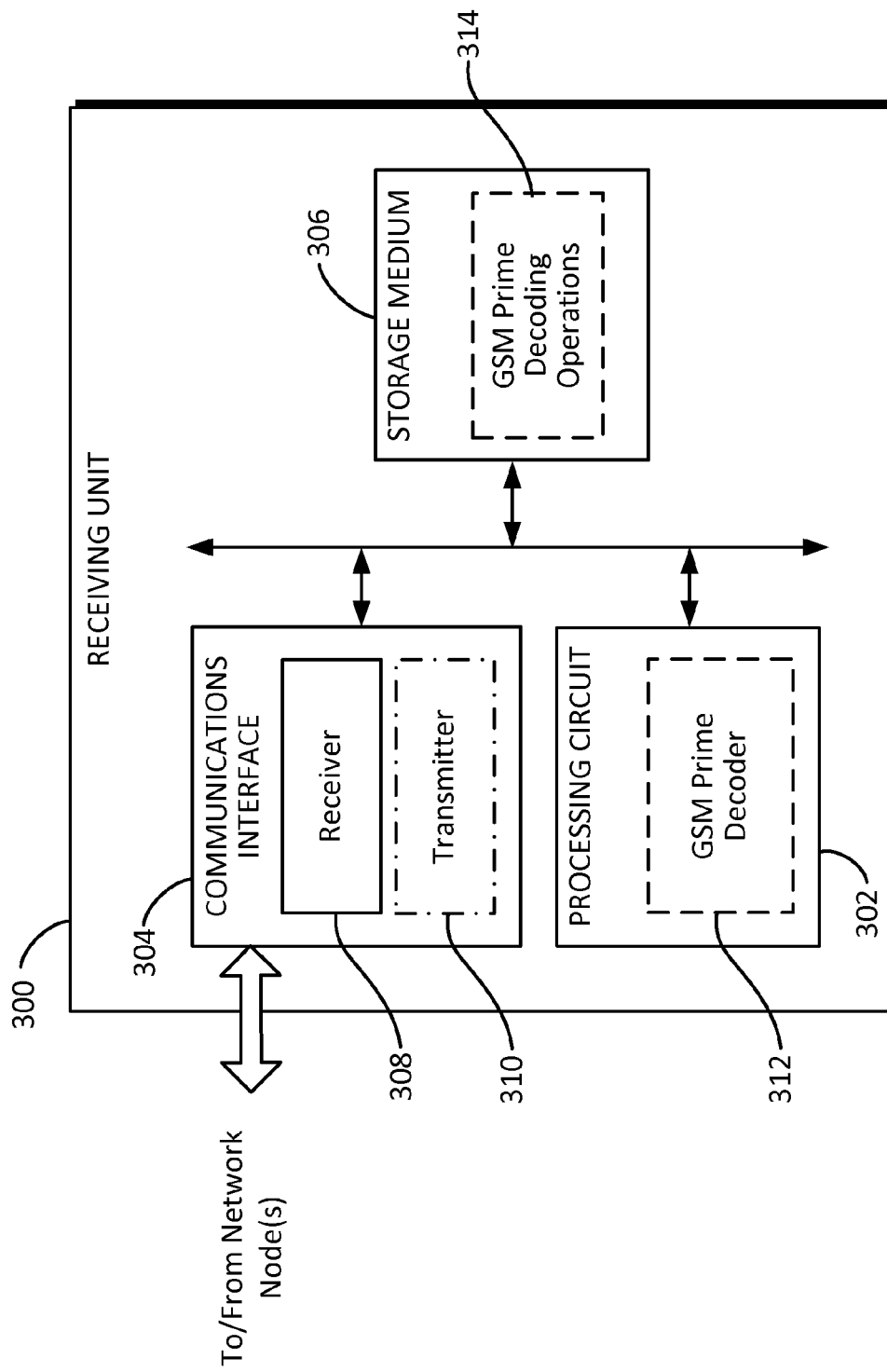
FIG. 3 is a block diagram conceptually illustrating an example of a receiving unit according to one example.

FIG. 3 is a block diagram illustrating select components of a receiving unit 300 adapted to employ such features according to at least one example. The receiving unit 300 may include a processing circuit 302 coupled to a communications interface 304 and to a storage medium 306.

The processing circuit 302 may be adapted to obtain, process, and/or send data, control data access and storage, issue commands, and control other desired operations. In some examples, the processing circuit 302 may be the same or similar to the processing system 114 illustrated in FIG. 1. In some examples, the processing circuit 302 may include circuitry configured to implement desired programming provided by appropriate media in at least one embodiment. For example, the processing circuit 302 may be implemented as one or more of a processor, a controller, a plurality of processors and/or other structure configured to execute executable instructions including, for example, software and/or firmware instructions, and/or hardware circuitry. Examples of the processing circuit 302 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit 302 are for illustration and other suitable configurations within the scope of the present disclosure are also contemplated.

The processing circuit 302 may be adapted for processing, including the execution of programming, which may be stored on the storage medium 306. In some instances, the processing circuit 302 may include a GSM Prime decoder 312. The GSM Prime decoder 312 may include circuitry and/or programming adapted to identify the GSM Prime transmission in accordance with synchronization information received from the base station, and to decode the data frames of the GSM Prime channel in accordance with control information received in control frames of the GSM Prime channel.

The communications interface 304 may be configured to facilitate wireless communications of the receiving unit 300. For example, the communications interface 304 may include circuitry and/or programming adapted to facilitate the communication of information with respect to one or more network nodes. The communications interface 304 may be coupled to one or more antennas (not shown), and includes at least one receiver circuit 308 (e.g., one or more receiver chains), and in some examples, at least one optional transmitter circuit 310 (e.g., one or more transmitter chains). By way of example and not limitation, when the receiving unit 300 includes the at least one transmitter circuit 310, it may include circuitry, devices and/or programming adapted to provide various signal conditioning functions including amplification, filtering, and modulating transmission frames onto a carrier for uplink transmission over a wireless medium through an antenna.

The storage medium 306 may represent one or more devices for storing programming and/or data, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor. By way of example and not limitation, the storage medium 306 may include a non-transitory computer-readable medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other non-transitory computer-readable mediums for storing information, as well as any combination thereof. The storage medium 306 may be coupled to, or at least accessible by the processing circuit 302 such that the processing circuit 302 can read information from, and write information to, the storage medium 306. In the examples, the storage medium 306 may be integral to the processing circuit 302.

Programming stored by the storage medium 306, when executed by the processing circuit 302, may cause the processing circuit 302 to perform one or more of the various functions and/or process steps described herein. The storage medium 306 may include GSM Prime decoding operations (i.e., instructions) 314. The GSM Prime decoding operations 314 may be implemented by the processing circuit 302 in, for example, the GSM Prime decoder 312. Thus, according to one or more aspects of the present disclosure, the processing circuit 302 may be adapted to perform any or all of the processes, functions, steps and/or routines for any or all of the access terminals (e.g., access terminal 204) described herein. As used herein, the term "adapted" in relation to the processing circuit 302 may refer to the processing circuit 302 being one or more of configured, employed, implemented, or programmed to perform a particular process, function, step and/or routine according to various features described herein.

Figure 4:
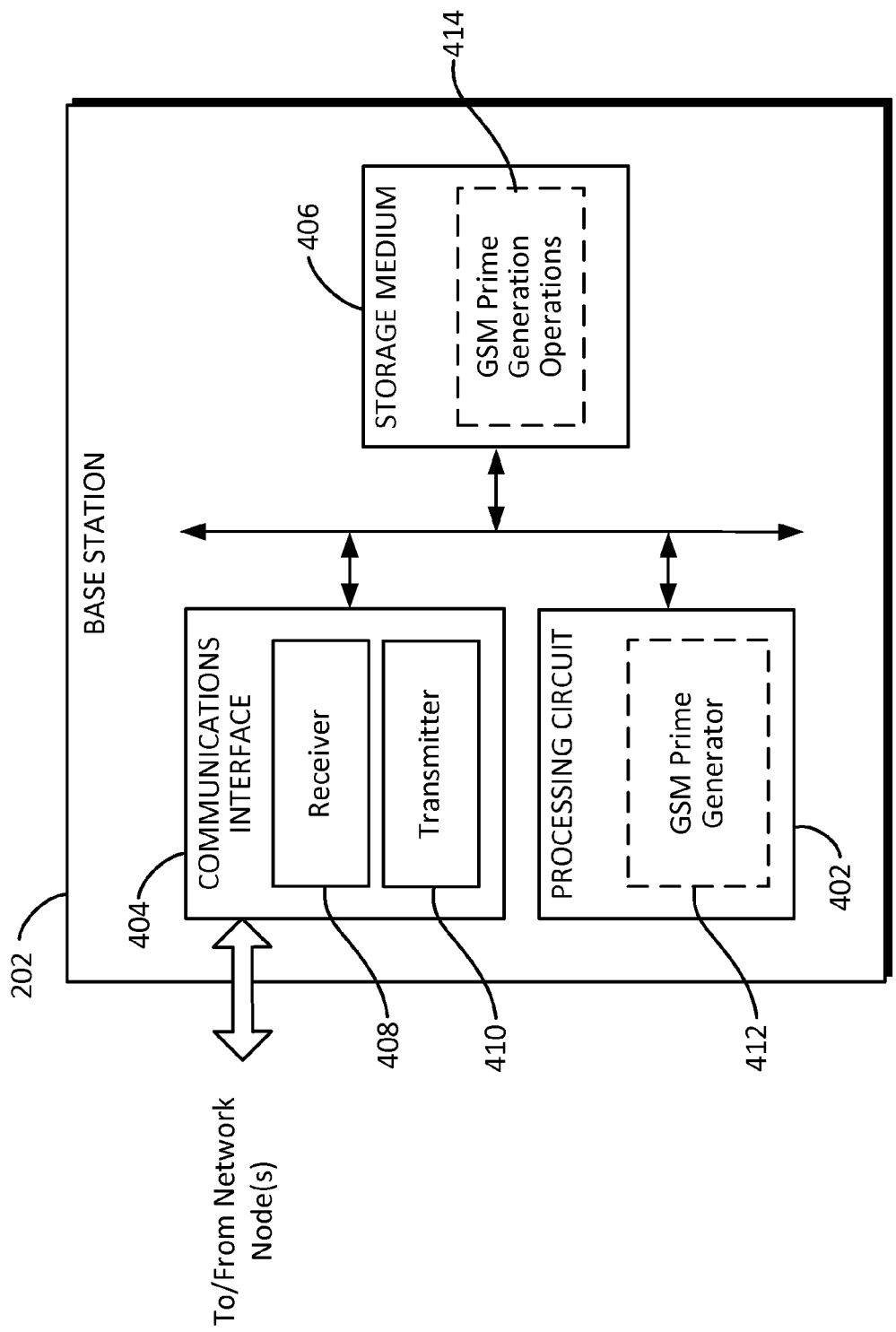
FIG. 4 is a block diagram conceptually illustrating an example of a base station according to one example.

According to various further aspects of the present disclosure, base stations are provided, which are adapted to transmit a supplemental channel (e.g., the GSM Prime channel) on a plurality of idle frames. Here, control information corresponding to the supplemental channel may be provided to the receiving unit on the BCH, and user data corresponding to the supplemental channel may be provided to the receiving unit on the TCH included on the same ARFCN on which the control information is provided. Turning to FIG. 4, a block diagram is shown illustrating select components of a base station 202 according to at least one implementation. The base station 202 may include a processing circuit 402 coupled to a communications interface 404 and to a storage medium 406.

The processing circuit 402 is arranged to obtain, process and/or send data, control data access and storage, issue commands, and control other desired operations. The processing circuit 402 may include circuitry configured to implement desired programming provided by appropriate media in at least one example, and may be implemented and/or adapted in a manner similar to the processing circuit 302 described above. In some instances, the processing circuit 402 may include a GSM Prime generator 412. The GSM Prime generator 412 may include circuitry and/or programming adapted to generate the GSM Prime channel for transmission by the communications interface 404.

The communications interface 404 is configured to facilitate wireless communications of the base station 202. For example, the communications interface 404 may include circuitry and/or programming adapted to facilitate the communication of information with respect to one or more receiving units 300. The communications interface 404 may be coupled to one or more antennas (not shown), and includes wireless transceiver circuitry, including at least one receiver circuit 408 (e.g., one or more receiver chains) and/or at least one transmitter circuit 410 (e.g., one or more transmitter chains).

The storage medium 406 may represent one or more devices for storing programming and/or data, such as processor executable code or instructions (e.g., software, firmware), electronic data, databases, or other digital information. The storage medium 406 may be configured and/or implemented in a manner similar to the storage medium 306 described above.

Like the storage medium 306, the storage medium 406 includes programming stored thereon. The programming stored by the storage medium 406, when executed by the processing circuit 402, causes the processing circuit 402 to perform one or more of the various functions and/or process steps described herein. For example, the storage medium 406 may include GSM Prime generation operations 412 adapted to cause the processing circuit 402 to generate the GSM Prime transmission. Thus, according to one or more aspects of the present disclosure, the processing circuit 402 may be adapted to perform (in conjunction with the storage medium 406) any or all of the processes, functions, steps and/or routines for any or all of the network nodes described herein (e.g., base station 202 and/or base station controller 206 in FIG. 2). As used herein, the term "adapted" in relation to the processing circuit 402 may refer to the processing circuit 402 being one or more of configured, employed, implemented, and/or programmed to perform a particular process, function, step and/or routine according to various features described herein.

Figure 5:
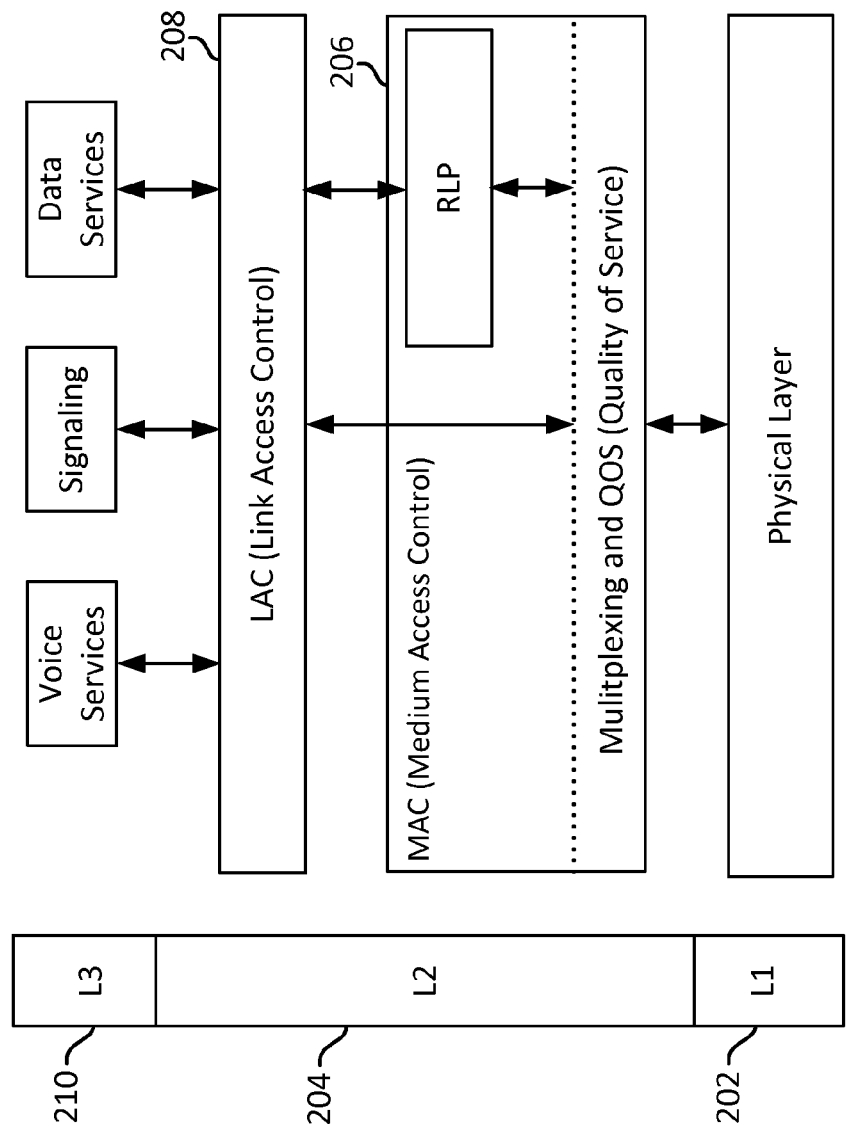
FIG. 5 is a conceptual diagram illustrating an example of a radio protocol architecture for an air interface according to one example.

FIG. 5 is a schematic diagram illustrating an example of a protocol stack architecture which may be implemented for communication between the base station 202 and the receiving unit 300. Referring to FIGS. 2-4, the protocol stack architecture for the air interface between the base station 202 and the receiving unit 300 is shown with three layers: Layer 1 (L1), Layer 2 (L2), and Layer 3 (L3).

Layer 1 502 is the lowest layer and implements various physical layer signal processing functions. Layer 1 502 is also referred to herein as the physical layer 502. This physical layer 502 provides for the transmission and reception of radio signals between the receiving unit 300 and a base station 202.

The data link layer, called layer 2 (or "the L2 layer") 504 is above the physical layer 502 and is responsible for delivery of signaling messages generated by Layer 3. The L2 layer 504 makes use of the services provided by the physical layer 502. The L2 layer 504 may include two sublayers: the Medium Access Control (MAC) sublayer 506, and the Link Access Control (LAC) sublayer 508.

The MAC sublayer 506 is the lower sublayer of the L2 layer 504. The MAC sublayer 506 implements the medium access protocol and is responsible for transport of higher layers' protocol data units using the services provided by the physical layer 502. The MAC sublayer 506 may manage the access of data from the higher layers to the shared air interface.

The LAC sublayer 508 is the upper sublayer of the L2 layer 504. The LAC sublayer 508 implements a data link protocol that provides for the correct transport and delivery of signaling messages generated at the layer 3. The LAC sublayer makes use of the services provided by the lower layers (e.g., layer 1 and the MAC sublayer).

Layer 3 510, which may also be referred to as the upper layer or the L3 layer, originates and terminates signaling messages according to the semantics and timing of the communication protocol between a base station 202 and the receiving unit 300. The L3 layer 510 makes use of the services provided by the L2 layer. Information (both data and voice) message are also passed through the L3 layer 510.

As discussed above, various aspects of the present disclosure may be implemented at one or both of the receiving unit 300 and/or the base station 202 to utilize what amounts to unused spectrum in the GSM space to enable effective low-rate broadcast or multicast services. That is, as described below, idle GSM frames, conventionally unused for downlink transmissions, can be utilized for carrying information on the downlink that may supplement GSM transmissions, or in some examples, be independent of GSM transmissions.

Figure 6:
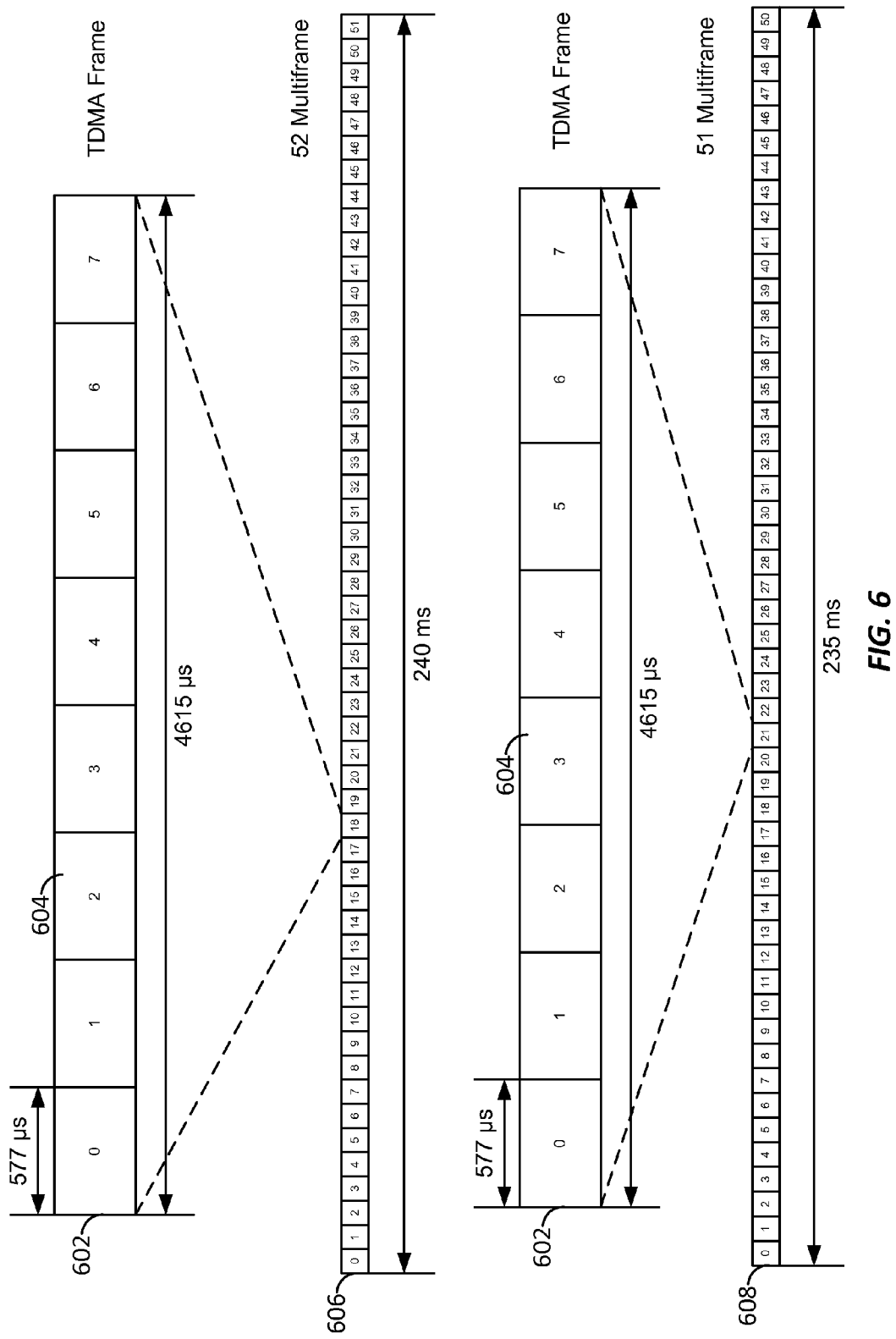
FIG. 6 is a schematic diagram illustrating multiframe structures in a GSM network.

FIG. 6 is a schematic diagram that illustrates one aspect of spectrum allocation in a conventional GSM network. According to GSM standards, the spectrum is allocated in 25-MHz increments: 25-MHz for the downlink and 25-MHz for the uplink. GSM uses both frequency division multiple access (FDMA) and time division multiple access (TDMA) to allocate this bandwidth among users.

The 25-MHz allocated for downlink transmissions is divided into 125 200-kHz channels, each identified by an absolute radio frequency channel number (ARFCN). Each 200-kHz ARFCN is then divided in the time domain into 4615-µs frames 602, where each frame 602 is divided among eight different users into eight 577-µs timeslots 604 using TDMA. Each frame 602 occupies one 200-kHz ARFCN for a duration of 4615-µs, which is subdivided into eight 577-µs timeslots 604. Typically, different users are assigned to each timeslot 604 within a frame 602.

These GSM frames 602 may be grouped together to form physical channels. For example, frames that are grouped together to perform certain functions may be grouped into multiframes. In GSM, signaling channels (which carry signaling or control information) such as a broadcast channel (BCH) may typically use 51-multiframes 608, which include a group of 51 frames 602; and traffic channels (which carry traffic or user data) such as a traffic channel (TCH) may typically use 52-multiframes 608, which include a group of 52 frames 602. In some examples within the scope of the present disclosure, for the traffic channels, 26-multiframes may be utilized; however, for the purposes of simplification in the present disclosure, only 52-multiframes 608 are described, with the understanding that these may be considered as two 26-multiframes.

In a conventional GSM system, each of the multiframes generally may include one or more idle frames, which may enable the receiving unit 300 to perform suitable idle mode procedures. That is, in a conventional GSM system, during the duration of these idle frames, a conventional access terminal is free to perform certain idle mode procedures such as but not limited to performing measurements of transmissions from one or more neighbor base stations.

GSM standards generally require all frames in a downlink transmission to include the same transmission power, and therefore, the idle frames include some form of transmission, e.g., random information, but these transmissions are generally ignored by receiving devices.

Figure 7:
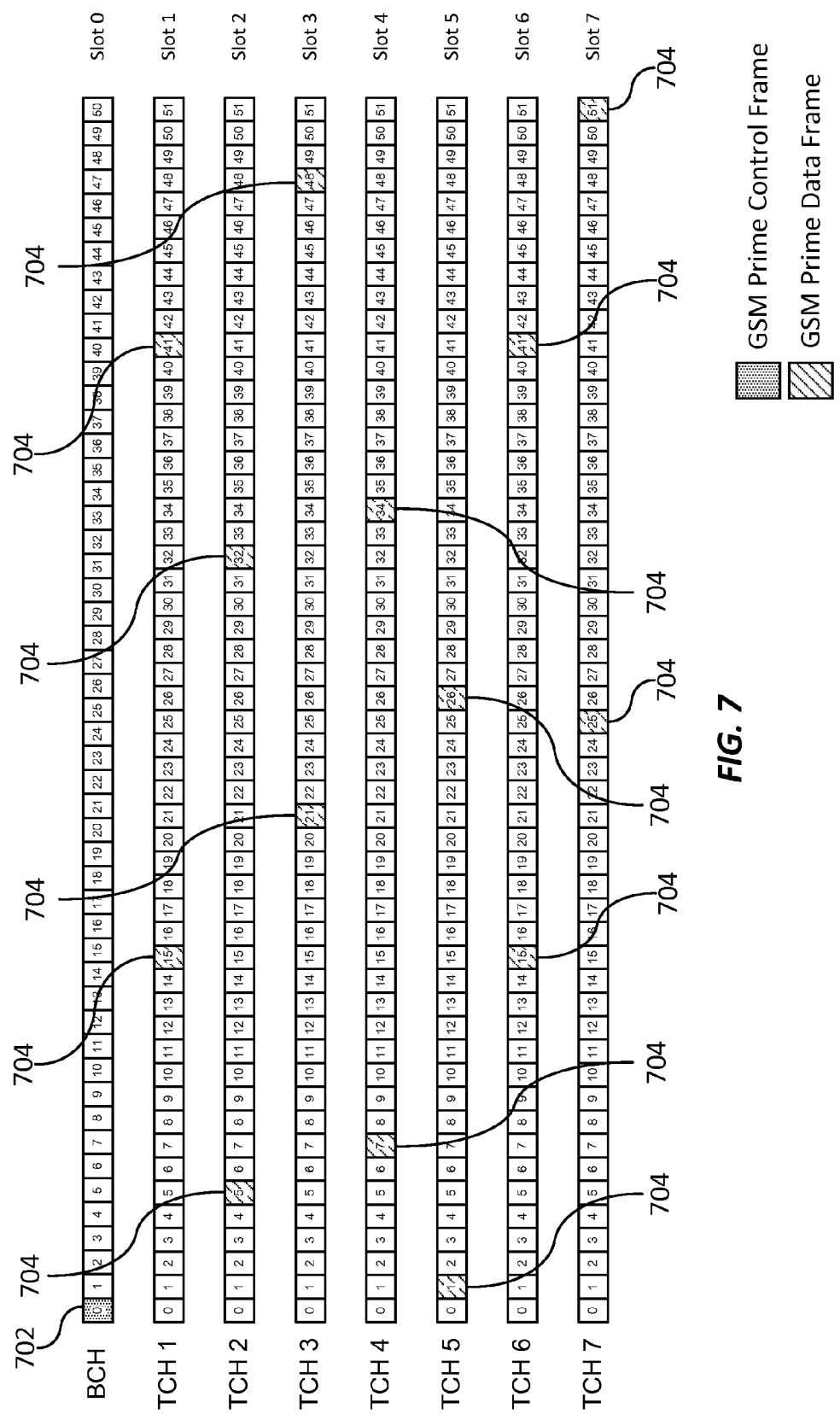
FIG. 7 is a schematic diagram illustrating a set of channels transmitted on an ARFCN and including a GSM Prime channel according to one example.

FIG. 7 is a conceptual diagram illustrating one example of a multiframe configuration for an ARFCN. Of course, those of ordinary skill in the art will comprehend that this is merely one possible configuration for an ARFCN for illustrative purposes, and any suitable configuration may be utilized within the scope of the present disclosure. In this example, the first slot includes a 51-multiframe for carrying a signaling on a broadcast channel (BCH) and the second through eighth slots include 52-multiframes for carrying traffic on a traffic channel (TCH). The BCH generally carries system parameters utilized by access terminals to identify the network, to synchronize time and frequency with the network, and to gain access to the network, and the TCH generally carries user data.

In the diagram, as illustrated in the shaded frames 702 and 704, each multiframe may include one or more idle frames, as described above. Here, during the slot carrying the BCH, the first frame is an idle frame 702. Furthermore, each of the slots carrying the TCH is illustrated including a 52-multiframe that includes two idle frames 704.

In accordance with various aspects of the present disclosure, these idle frames 702 and 704 may be utilized to carry downlink information in a supplemental channel that may be referred to herein under the nomenclature GSM Prime. That is, this GSM Prime channel may supplement conventional GSM downlink communication, utilizing what amounts to unused spectrum in the conventional GSM network to enable additional communication capability in the downlink direction.

For example, in some aspects of the disclosure, the idle slot 702 in the broadcast channel BCH can carry control information for the GSM Prime channel, and the idle slots 704 in the traffic channels TCH can carry data information for the GSM Prime channel. That is, in an aspect of the present disclosure, the first frame transmitted within a super-frame may be configured to include control information for the GSM Prime channel, enabling a receiving unit 300 to decode the GSM Prime channel as described below.

Figure 8:
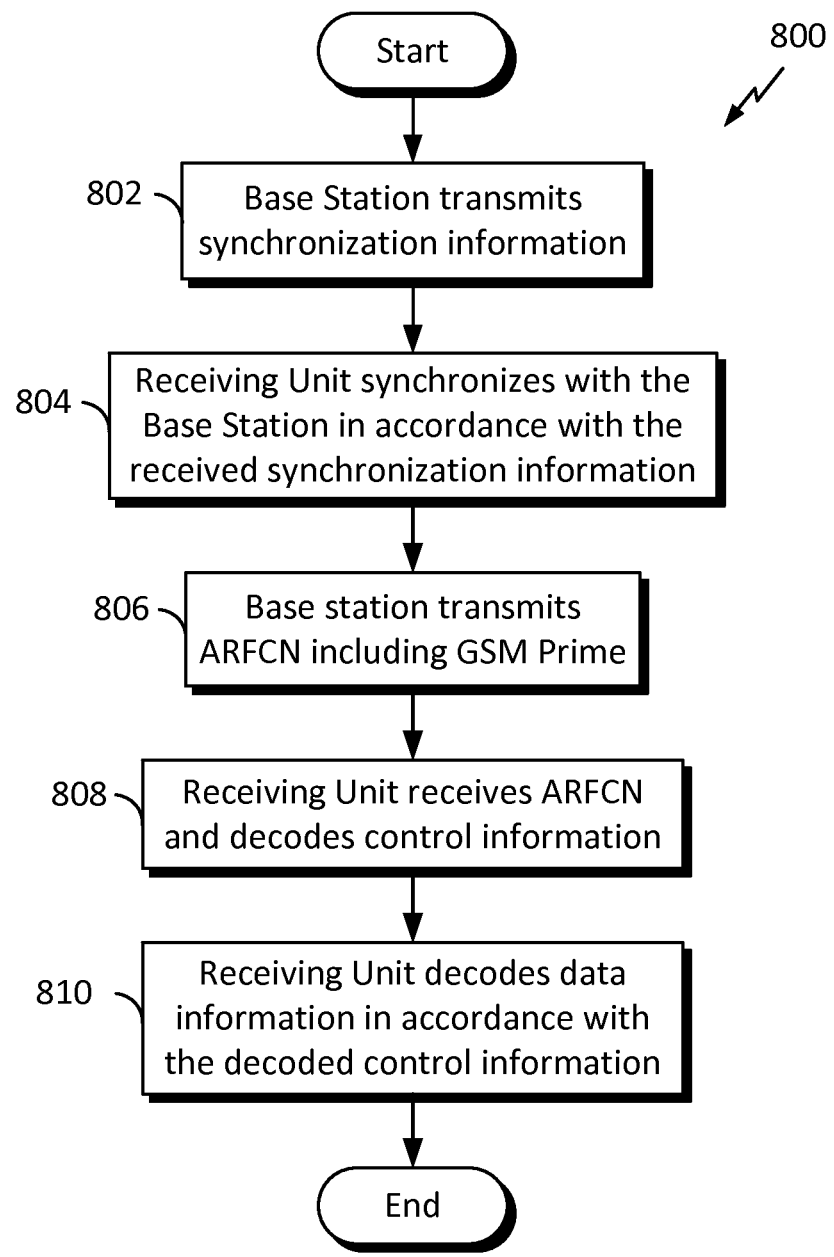
FIG. 8 is a flow chart illustrating a process of wireless communication utilizing a supplemental GSM Prime channel according to one example.

FIG. 8 is a flow chart illustrating an exemplary process of utilizing the GSM Prime channel to transmit information from a base station 202 to a receiving unit 300 in accordance with some aspects of the present disclosure.

At step 802, the base station 202 may transmit synchronization information to the receiving unit 300, where the synchronization information is adapted to enable the receiving unit 300 to locate the idle frame 702 at the beginning of the BCH, which contains the control information. In some examples, this synchronization information may be provided on one or more channels such as the FCCH or SCH as provided in a GSM network. At step 804, the receiving unit 300 may synchronize with the base station 202 in accordance with the received synchronization information, such that it may thereafter receive and decode the GSM Prime control information contained in the idle frame 702 at the beginning of the BCH.

At step 806, the base station 202 may transmit an ARFCN including the GSM Prime channel, e.g., including the idle frame 702 at the first frame of a BCH at slot 0, and one or more idle frames 704 in traffic channels TCH at slots 1-7. At step 808, the receiving unit 300 may receive the transmitted ARFCN and decode the control information contained in the idle frame 702 at the first frame of the BCH. Here, the control information in the BCH idle slot may carry, for example, a signature to identify the transmitter of the ARFCN (e.g., the base station 202); information to identify the position in the TCH (in the slots 1-7) on that ARFCN of the idle frames 704 containing the corresponding user data; and information to enable decoding of that data.

At step 810 the receiving unit 300 may decode the data information received in the idle frames 704 containing the user data in accordance with the decoded control information described above. In some aspects of the disclosure, each idle frame 704 can generally carry from 114 bits to 342 bits of information; therefore, by using 14 idle frames 704 as illustrated in FIG. 7, PHY layer data rates OF up to 20 kbps can be achieved. In this way, a service such as a music channel could be provided by a network operator without losing any capacity of existing networks.

Of course, various examples within the scope of the present disclosure need not necessarily utilize the idle frame structure or locations illustrated in FIG. 7, and this figure is merely illustrative in nature. That is, other examples within the scope of the disclosure may utilize any suitable number of idle frames 704 for carrying user data corresponding to a GSM Prime transmission. Moreover, idle frames 704 for carrying the user data need not be only in the TCH slots, and may appear in the BCH slot as well. Still further, idle frames 702 for carrying the control information need not necessarily be limited to the first idle frame of the super-frame, but may additionally or alternatively include one or more other idle frames within the transmitted ARFCN.

In various aspects of the present disclosure, the utilization of the idle frames 702 and 704 as described above to transmit the GSM Prime channel may be adapted to carry a separate, independent data stream not necessarily related in any way to the information carried on the GSM network. That is, other than determining the synchronization information as described above at step 802, the receiving unit 300 need not be fully equipped for communication under the GSM standards, and may be a simplified receiving unit such as a streaming media receiver. Of course, in other aspects of the present disclosure, the receiving unit 300 may be fully equipped for communication under the GSM standards and may additionally be adapted to receive the GSM Prime channel described herein.

In some examples, the utilization of the idle time slots in accordance with aspects of the present disclosure could be integrated into the GSM standard, to provide for an additional communication channel for some or all devices operating in accordance with the standard. In other examples, the utilization of the idle time slots in accordance with aspects of the present disclosure need not be included in the standards and may be implemented by a network operator without affecting the performance or operation of standardized devices.

That is, in existing GSM standards, power is always sent during the idle time slots within an ARFCN that includes the BCH, as described herein. However, the existing standards do not specify what the form of the power transmitted during these slots is, and for example may consist of randomized transmissions. Thus, utilization of these idle time slots to include the signaling and data described in the present disclosure can still conform to the standards, and legacy devices conforming to those standards would simply ignore the information in the idle slots utilized within the present disclosure for transmission of the GSM Prime channel.

Moreover, a receiving device or access terminal configured to receive the signaling and data transmitted during the idle time slots as described in the present disclosure may or may not be capable of utilizing a conventional GSM network. That is, a device configured to receive the signaling and data transmitted during the idle time slots as described in the present disclosure need not necessarily have a SIM, need not necessarily include transmission capabilities, and need not necessarily conform to the GSM standards in any way. Rather, a receiving device configured according to some aspects of the present disclosure may simply detect the signaling and data transmitted in the idle time slots and process the received data accordingly, for example, by playing a received music stream.

Several aspects of a telecommunications system have been presented with reference to a GSM system. As those skilled in the art will readily appreciate, various aspects described throughout this disclosure may be extended to other telecommunication systems, network architectures and communication standards.

By way of example, various aspects may be extended to systems employing cdma2000, evolution data-optimized (EV-DO), Universal Mobile Telecommunications Systems (UMTS), Long Term Evolution (LTE) (in FDD, TDD, or both modes), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

We claim:

1. A method of wireless communication in a global system for mobile (GSM) network, the method operable at a receiving unit, the method comprising:
   receiving a transmission comprising GSM signaling, GSM data, and a plurality of idle frames, wherein at least one of the plurality of idle frames is used as a control frame comprising control information that enables at least one data frame within the plurality of idle frames to be decoded;
   decoding the at least one data frame in accordance with the control information in the control frame;
   receiving synchronization information comprising timing of at least one idle frame of the plurality of idle frames; and
   synchronizing reception of the transmission in accordance with the received synchronization information.

2. The method of claim 1, wherein the control frame is received in a broadcast channel and the at least one data frame is received in at least one traffic channel.

3. The method of claim 1, wherein the received transmission comprises a super-frame transmitted on an absolute radio frequency channel number (ARFCN).

4. The method of claim 3, wherein the control frame comprises an initial frame of the super-frame, wherein the super-frame comprises the control frame and the at least one data frame.

5. The method of claim 3, wherein the control frame comprises information adapted to indicate a position of the at least one data frame within the super-frame.

6. The method of claim 1, wherein the receiving unit is capable of bi-directional communication utilizing the GSM network.

7. A receiving unit configured for wireless communication in a global system for mobile (GSM) network, comprising:
   means for receiving a transmission comprising GSM signaling, GSM data, and a plurality of idle frames, wherein at least one of the plurality of idle frames is used as a control frame comprising control information that enables at least one data frame within the plurality of idle frames to be decoded;
   means for decoding the at least one data frame in accordance with the control information in the control frame;
   means for receiving synchronization information comprising timing of at least one idle frame of the plurality of idle frames; and
   means for synchronizing reception of the transmission in accordance with the received synchronization information.

8. The receiving unit of claim 7, wherein the control frame is received in a broadcast channel and the at least one data frame is received in at least one traffic channel.

9. The receiving unit of claim 7, wherein the received transmission comprises a super-frame transmitted on an absolute radio frequency channel number (ARFCN).

10. The receiving unit of claim 9, wherein the control frame comprises an initial frame of the super-frame, wherein the super-frame comprises the control frame and the at least one data frame.

11. The receiving unit of claim 9, wherein the control frame comprises information adapted to indicate a position of the at least one data frame within the super-frame.

12. The receiving unit of claim 7, wherein the receiving unit is capable of bi-directional communication utilizing the GSM network.

13. A computer program product, comprising:
   a non-transitory computer-readable storage medium configured for operation in a global system for mobile (GSM) network, the computer-readable storage medium comprising:
   instructions for causing a computer to receive a transmission comprising GSM signaling, GSM data, and a plurality of idle frames, wherein at least one of the plurality of idle frames is used as a control frame comprising: control information that enables at least one data frame within the plurality of idle frames to be decoded;
   instructions for causing a computer to decode the at least one data frame in accordance with the control information in the control frame;
   instructions for causing a computer to receive synchronization information comprising timing of at least one idle frame of the plurality of idle frames; and
   instructions for causing a computer to synchronize reception of the transmission in accordance with the received synchronization information.

14. The computer program product of claim 13, wherein the control frame is received in a broadcast channel and the at least one data frame is received in at least one traffic channel.

15. The computer program product of claim 13, wherein the received transmission comprises a super-frame transmitted on an absolute radio frequency channel number (ARFCN).

16. The computer program product of claim 15, wherein the control frame comprises an initial frame of the super-frame, wherein the super-frame comprises the control frame and the at least one data frame.

17. The computer program product of claim 15, wherein the control frame comprises information adapted to indicate a position of the at least one data frame within the super-frame.

18. The computer program product of claim 13, wherein the receiving unit is capable of bi-directional communication utilizing the GSM network.

19. A receiving unit configured for wireless communication in a global system for mobile (GSM) network, comprising:
   a processing circuit;
   a communications interface coupled to the processing circuit; and
   a memory coupled to the processing circuit,
   wherein the processing circuit is configured to:
      receive a transmission comprising GSM signaling, GSM data, and a plurality of idle frames, wherein at least one of the plurality of idle frames is used as a control frame comprising control information that enables at least one data frame within the plurality of idle frames to be decoded;
      decode the at least one data frame in accordance with the control information in the control frame;
      receive synchronization information comprising timing of at least one idle frame of the plurality of idle frames; and
      synchronize reception of the transmission in accordance with the received synchronization information.

20. The receiving unit of claim 19, wherein the control frame is received in a broadcast channel and the at least one data frame is received in at least one traffic channel.

21. The receiving unit of claim 19, wherein the received transmission comprises a super-frame transmitted on an absolute radio frequency channel number (ARFCN).

22. The receiving unit of claim 21, wherein the control frame comprises an initial frame of the super-frame, wherein the super-frame comprises the control frame and the at least one data frame.

23. The receiving unit of claim 21, wherein the control frame comprises information adapted to indicate a position of the at least one data frame within the super-frame.

24. The receiving unit of claim 19, wherein the receiving unit is capable of bi-directional communication utilizing the GSM network.

* * * * *